US011108990B2

(12) United States Patent
Hashimoto et al.

(10) Patent No.: US 11,108,990 B2
(45) Date of Patent: Aug. 31, 2021

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventors: Kazunari Hashimoto, Kanagawa (JP); Seiya Inagi, Kanagawa (JP); Teppei Aoki, Kanagawa (JP); Daisuke Yasuoka, Kanagawa (JP); Tadaaki Sato, Kanagawa (JP); Hidetaka Izumo, Kanagawa (JP); Yusuke Yamaura, Kanagawa (JP); Hiroshi Umemoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 111 days.

(21) Appl. No.: 16/129,810

(22) Filed: Sep. 13, 2018

(65) Prior Publication Data

US 2019/0089930 A1 Mar. 21, 2019

(30) Foreign Application Priority Data

Sep. 20, 2017 (JP) .............................. JP2017-180369

(51) Int. Cl.
*H04N 7/15* (2006.01)
*G06T 19/20* (2011.01)
(Continued)

(52) U.S. Cl.
CPC ............. *H04N 7/157* (2013.01); *G02B 27/01* (2013.01); *G06F 3/011* (2013.01); *G06F 3/013* (2013.01);
(Continued)

(58) Field of Classification Search
USPC ....................................................... 348/14.08
See application file for complete search history.

(56) References Cited

U.S. PATENT DOCUMENTS 9,836,263 B2 12/2017 Kasahara
2012/0235900 A1* 9/2012 Border ................... G06F 3/011
345/156
2017/0331924 A1* 11/2017 Katori ..................... H04L 67/18

FOREIGN PATENT DOCUMENTS

JP 2010282163 12/2010
JP 2012118882 6/2012
(Continued)

OTHER PUBLICATIONS

Office Action of Japan Counterpart Application, with English translation thereof, dated Jun. 22, 2021, pp. 1-9.

*Primary Examiner* — Amal S Zenati
(74) *Attorney, Agent, or Firm* — JCIPRNET

(57) ABSTRACT

An information processing apparatus includes a reception unit and an instruction unit. The reception unit receives identification information of a user of a display device and position information indicating a predetermined place, from the display device which displays an image of a virtual space so as to be superimposed on a real space. The instruction unit instructs the display device to display public information associated with the position information, at the predetermined place or in the vicinity thereof, as an image of the virtual space, in a case where the public information is included in a public partner as a group belonging to an organization having the identification information of the user.

11 Claims, 19 Drawing Sheets

(51) Int. Cl.
*G06T 19/00* (2011.01)
*G06F 16/438* (2019.01)
*G06F 3/0346* (2013.01)
*G06F 3/01* (2006.01)
*G02B 27/01* (2006.01)

(52) U.S. Cl.
CPC ............ *G06F 3/017* (2013.01); *G06F 3/0346* (2013.01); *G06F 16/4393* (2019.01); *G06T 19/006* (2013.01); *G06T 19/20* (2013.01)

(56) References Cited

FOREIGN PATENT DOCUMENTS

| | | |
|---|---|---|
| JP | 2012221249 | 11/2012 |
| JP | 2014203194 | 10/2014 |
| JP | 5780372 | 9/2015 |
| JP | 2016115148 | 6/2016 |

\* cited by examiner

FIG. 6

| USER ID | USER NAME | BELONGING DEPARTMENT | USER TYPE | CONTENT ID | NUMBER OF VIEWS |
|---|---|---|---|---|---|
| user001 | A | SALES | REGULAR EMPLOYEE (MANAGEMENT POSITION) | C1 | 3 |
|  |  |  |  | C2 | 2 |
| user002 | B | INTELLECTUAL PROPERTY | REGULAR EMPLOYEE (GENERAL POSITION) | C1 | 2 |
|  |  |  |  | C2 | 0 |
| user003 | C | TECHNOLOGY | DISPATCH | C1 | 0 |
|  |  |  |  | C2 | 0 |
| ... | ... | ... | ... | ... | ... |

| CONTENT ID | CONTENT NAME | PUBLIC PARTNER | USER ID OF CONTENT WRITER | POSITION INFORMATION | VALID PERIOD | CONTENT DATA | COMMENT INFORMATION | |
|---|---|---|---|---|---|---|---|---|
| | | | | | | | USER ID | COMMENT CONTENT |
| C1 | ××PROJECT PARTICIPANT RECRUITMENT | INTELLECTUAL PROPERTY | user001 | $(x_1, y_1, z_1)$ (SPECIFIC WALL OF CAFETERIA) | ... | ... | user003 | ... |
| | | | | | | | user001 | ... |
| | | | | | | | user005 | ... |
| C2 | ○○ CONFERENCE | SALES | user002 | $(x_2, y_2, z_2)$ (SPECIFIC WALL OF LOBBY) | ... | ... | ... | ... |
| ... | ... | ... | ... | ... | ... | ... | ... | ... |

| USER ID | USER NAME | BELONGING DEPARTMENT | USER TYPE |
|---|---|---|---|
| user001 | A | SALES | REGULAR EMPLOYEE (MANAGEMENT POSITION) |
| user002 | B | INTELLECTUAL PROPERTY | REGULAR EMPLOYEE (GENERAL POSITION) |
| user003 | C | TECHNOLOGY | DISPATCH |
| ... | ... | ... | ... |

| OBJECT ID | FEATURE INFORMATION | POSITION INFORMATION | VALID PERIOD | PUBLIC PARTNER | USER ID OF A MESSAGE GRANTOR | MESSAGE |
|---|---|---|---|---|---|---|
| 1001 | ... | ... | ... | INTELLECTUAL PROPERTY | user001 | THIS IS MINE. PLEASE DO NOT DRINK. |
| 1002 | ... | ... | ... | ALL | user002 | ... |
| ... | ... | ... | ... | ... | ... | ... |

313

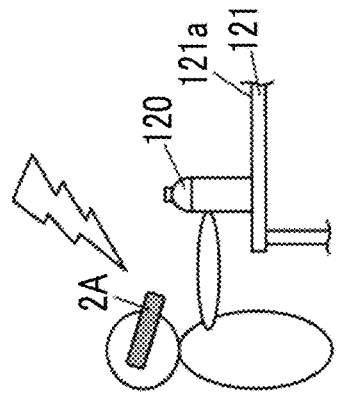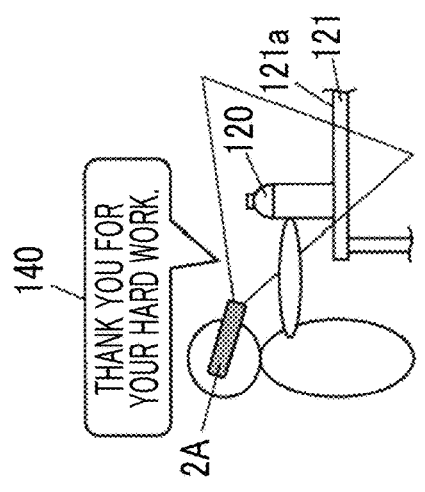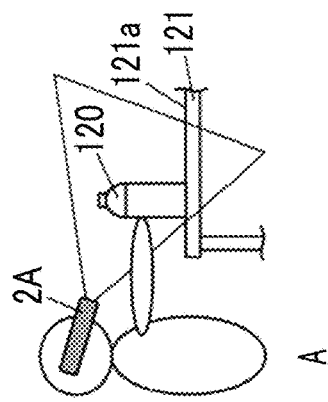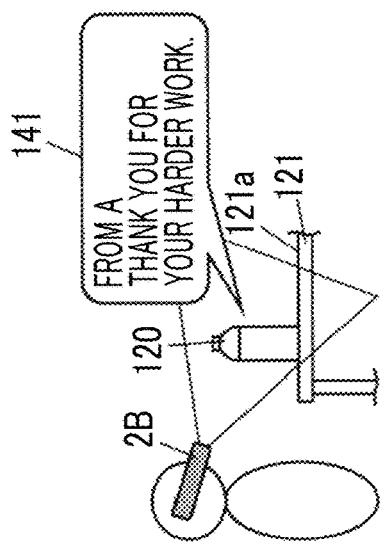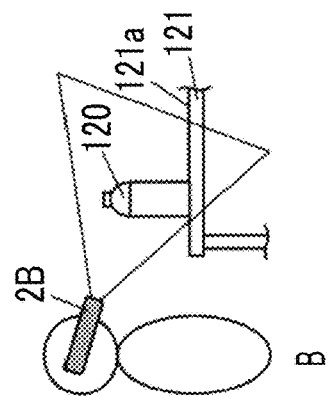

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-180369 filed Sep. 20, 2017.

BACKGROUND

Technical Field

The present invention relates to an information processing apparatus, an information processing system, and a non-transitory computer readable medium storing a program.

SUMMARY

According to an aspect of the invention, there is provided an information processing apparatus including a reception unit that receives identification information of a user of a display device and position information indicating a predetermined place, from the display device which displays an image of a virtual space so as to be superimposed on a real space; and an instruction unit that instructs the display device to display public information associated with the position information, at the predetermined place or in the vicinity thereof, as an image of the virtual space, in a case where the public information is included in a public partner as a group belonging to an organization having the identification information of the user.

BRIEF DESCRIPTION OF THE DRAWINGS

Exemplary embodiment(s) of the present invention will be described in detail based on the following figures, wherein:

FIG. 6 is a diagram showing an example of a user attribute table;

FIG. 7 is a diagram showing an example of a content table;

FIG. 15 is a diagram showing an example of a user attribute table;

FIG. 16 is a diagram showing an example of an object table;

FIGS. 19A to 19E are diagrams showing modification examples of the second exemplary embodiment.

DETAILED DESCRIPTION

Figure 1:
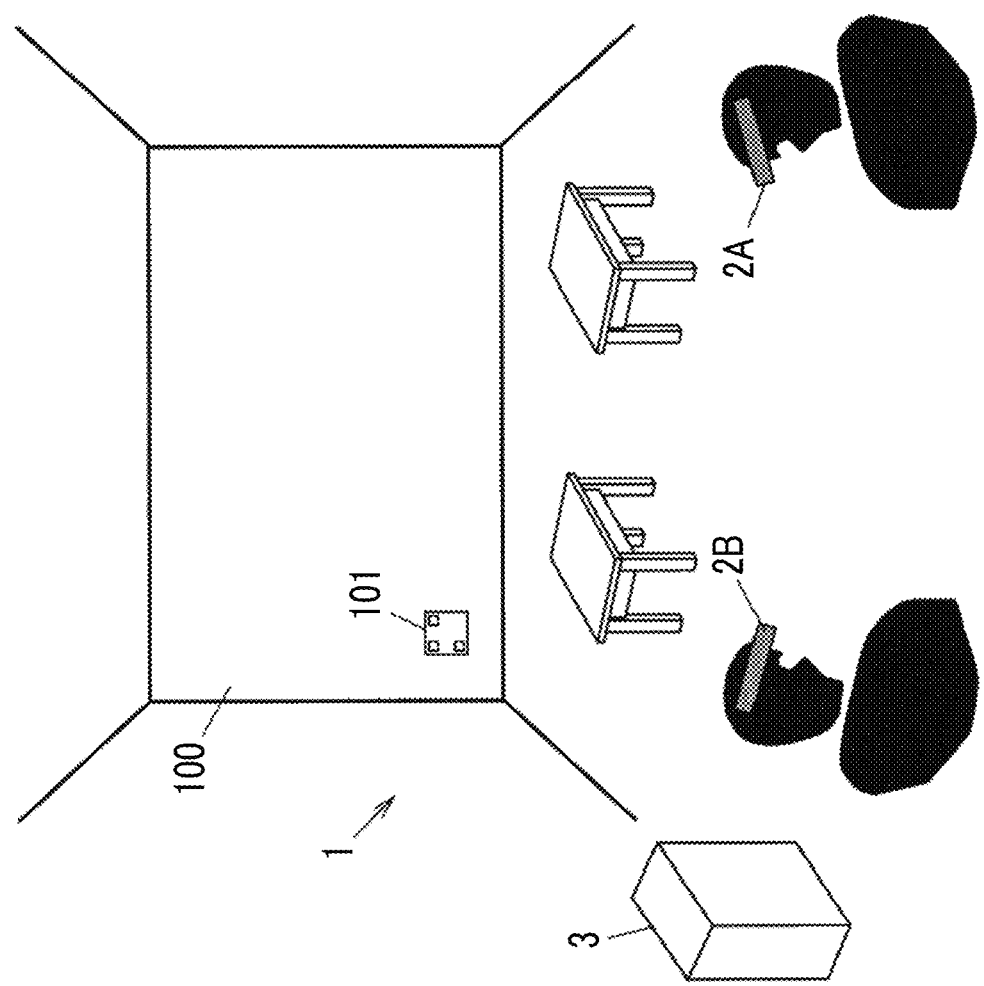
FIG. 1 is a diagram illustrating a configuration example of an information processing system according to a first exemplary embodiment of the present invention.

Hereinafter, an exemplary embodiment of the present invention will be described in detail with reference to the accompanying drawings. In the drawings, the same reference numerals are attached to the constituent elements having substantially the same function, and duplicated explanations are omitted.

SUMMARY OF EXEMPLARY EMBODIMENT

An information processing apparatus of the present exemplary embodiment includes a reception unit that receives identification information of a user of a display device and position information indicating a position of a predetermined place, from the display device which displays an image of a virtual space so as to be superimposed on a real space; and an instruction unit that instructs the display device to display public information associated with the position information, at the predetermined place or in the vicinity thereof, as an image of the virtual space, in a case where the identification information of the user is included in a public partner.

The "display device" includes a head mounted display device of a light transmission type which is worn on the head of the user and allows the user to view a public information as the image of the virtual space and at the same time directly view the real space (outside scene), a portable information terminal which displays a public information as an image of a virtual space so as to be superimposed on an image obtained by capturing an outside scene, and the like. The head mounted display device of a light transmission type may be a goggle type or an eyeglass type. The portable information terminal may be a head mounted type.

First Exemplary Embodiment

FIG. 1 is a diagram illustrating a configuration example of an information processing system according to a first exemplary embodiment of the present invention.

The information processing system 1 includes a head mounted display device (hereinafter referred to as "HMD device") 2A used by a first person, an HMD device 2B used by a second person, and an information processing apparatus 3 that controls each of the HMD devices 2A and 2B (hereinafter collectively referred to as "HMD device 2"). The HMD device 2 and the information processing apparatus 3 are connected to each other so as to communicate with each other wirelessly. The HMD device 2 is an example of the display device.

For example, the first person and the second person belong to the same organization but different groups constituting the organization. "Organization" refers to a group of people including, for example, a company, an organization belonging to a company (a department, a team, a group, or the like), an association, or the like. For example, groups constitute lower layers of the organization. The first person and the second person are also collectively referred to as users hereinafter.

Such an information processing system 1 can be used in, for example, the cafeteria, the conference room, the multi-purpose room, the common room or the like of an office, a public facility, a hospital, or the like. These places are examples of predetermined places.

FIG. 1 shows a state in which, for example, a first person wears an HMD device 2A and a second person wears an HMD device 2B in an office cafeteria. On the wall 100 of the cafeteria, a code image 101 indicating position information of the wall 100 of the cafeteria is formed. The sheet on which the code image 101 is printed may be pasted on the wall 100 or the code image 101 may be directly printed on the wall 100. The wall 100 of the cafeteria is an example of a predetermined place (also is referred to as a specific place).

The code image 101 is, for example, QR code (registered trademark) in which position information indicating the position of a predetermined place is encrypted. In addition, the code image 101 is not limited to the QR code (registered trademark), but may be a two-dimensional code such as PDF417, Data Matrix, and Maxi Code, and may be a one-dimensional code such as a bar code, a unique code, or a dot pattern. Further, plural types of codes may be combined according to a purpose.

The HMD device 2 displays an image of a virtual space (hereinafter also referred to as "virtual image") so as to be superimposed on a real space (outside scene), that is, virtually displays a virtual image. Specifically, the HMD device 2 is a head mounted display device of a light transmission type which is worn on the head of the user and allows the user to view a virtual image and at the same time directly view the outside scene.

Figure 2:
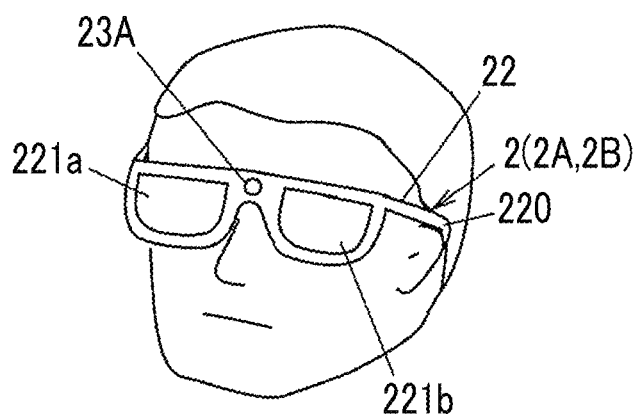
FIG. 2 is an external view illustrating an example of a head mounted display device.

FIG. 2 is an external view showing an example of the HMD device 2. The HMD device 2 includes a display unit 22 and an outward-facing camera 23A. The display unit 22 includes a frame 220 to be worn on the ear, a right transmissive display 221a, and a left transmissive display 221b (collectively referred to as "transmissive display 221").

For the transmissive display 221, for example, a transmissive liquid crystal display, a transmissive organic EL display, a transmissive inorganic EL display, or the like can be used. The right transmissive display 221a displays the display image for the right eye and the left transmissive display 221b displays the display image for the left eye. The display image for the right eye and the display image for the left eye are superimposed on the outside scene and are viewed by the user of the HMD device 2 as a virtual image.

Configuration of HMD Device

FIG. 2 is a diagram showing an example of a control system of the HMD device 2. The HMD device 2 includes a controller 20 that controls each unit of the HMD device 2, a memory 21 that stores various types of information, the display unit 22, the outward-facing camera 23A, an inward-facing camera 23B, a sensor unit 24, a voice input unit 25, a position detection unit 26, a processing unit 27, and a wireless communication unit 28.

The controller 20 includes a central processing unit (CPU), an interface, and the like. The CPU functions as a transmission unit 200, a reception unit 201, a display controller 202, a virtual camera image generation unit 203 and the like by operating in accordance with the program 210 stored in the memory 21. Details of each of the units 200 to 203 will be described later.

The memory 21 includes a read only memory (ROM), a random access memory (RAM), a hard disk, and the like, and stores programs, data, and the like.

The outward-facing camera 23A captures an outside scene or the face of a face-to-face person and the hand of the user of the HMD device 2 and sends the captured images to the controller 20. The inward-facing camera 23B captures the eyes of the user of the HMD device 2, and sends the captured image to the controller 20. The images captured by the outward-facing camera 23A and the inward-facing camera 23B may be a still image or a moving image. In the case of specifying a face-to-face person by a face image, it may be a still image, but in the case of detecting a gesture by capturing the hand or the like of the user or detecting a gaze, for example, a moving image or continuous still images obtained by capturing plural images per second are preferred.

The sensor unit 24 includes a range image sensor, an acceleration sensor, and a gyro sensor. As the range image sensor, for example, an infrared range sensor, a laser range sensor, an ultrasonic range sensor, or the like can be used. The range image sensor emits infrared rays, laser, ultrasonic waves or the like, reads the distance for each pixel based on the time difference of the reflection and obtains a range image. The acceleration sensor detects the acceleration applied to the HMD device 2. The gyro sensor detects the angular velocity applied to the HMD device 2.

The voice input unit 25 includes a microphone, and converts the voice uttered by the user of the HMD device 2 into a voice signal which is an electric signal and inputs it.

The processing unit 27 processes information input from the outward-facing camera 23A, the inward-facing camera 23B, the sensor unit 24, and the voice input unit 25, and includes a gesture detection unit 270, a gaze detection unit 271, and a voice recognition unit 272.

The gesture detection unit 270 detects a gesture indicating the movement of the user. Specifically, the gesture detection unit 270 detects a predetermined gesture of the hand, based on the motion of the user's hand (for example, a pinch motion with two fingers), from the range image detected by the range image sensor of the sensor unit 24. Further, the gesture detection unit 270 detects the predetermined gesture of the head from the movement of the user's head (for example, shaking in the left and right direction), based on the acceleration of the HMD device 2 detected by the acceleration sensor of the sensor unit 24 and the angular velocity of the HMD device 2 detected by the gyro sensor. The gesture detection unit 270 transmits a command corresponding to the detected gesture to the controller 20.

The gaze detection unit 271 detects the user's gaze direction from the image obtained by the inward-facing camera 23B capturing the user's eyes, and transmits the detected gaze direction and a command corresponding to the gaze direction to the controller 20. As a gaze detection technique, for example, the gaze may be detected based on the position of the iris relative to the inner corner position by using a visible light camera for the inward-facing camera 23B, and the gaze direction may be detected based on the position of the pupil with respect to the position of the corneal reflection by using an infrared camera and an infrared LED for the inward-facing camera 23B. Note that gaze direction may be used instead of a gesture.

The voice recognition unit 272 converts the voice signal input by the voice input unit 25 into digital voice data and transmits the voice data to the controller 20.

The wireless communication unit 28 communicates with the information processing apparatus 3 using, for example, a wireless LAN such as wireless fidelity (Wi-Fi), Wi-Fi direct, or short-range wireless communication such as Bluetooth (registered trademark), and infrared communication. It should be noted that the wireless communication unit 28 may communicate between the HMD devices 2.

The position detection unit 26 periodically detects the position information indicating the position of the HMD devices 2 using a global positioning system (GPS) or the like, and transmits the detected position information to the controller 20. It should be noted that the position of the HMD devices 2 may be detected using a beacon signal. That is, the position detection unit 26 detects a beacon signal including a beacon ID identifying a beacon transmitter, and transmits the beacon ID and the intensity information of the beacon signal to the information processing apparatus 3. The information processing apparatus 3 acquires the position information of the HMD device 2 from the information on the position of the beacon transmitter corresponding to the beacon ID and the intensity of the beacon signal.

Next, each of the units 200 to 203 of the HMD device 2 will be described.

The transmission unit 200 transmits to the information processing apparatus 3, the image captured by the outward-facing camera 23A, the processing results by the processing unit 27 (for example, the command corresponding to the gesture detected by the gesture detection unit 270, the gaze direction detected by the gaze detection unit 271 and the command corresponding to the gaze direction, or the voice data recognized by the voice recognition unit 272), the position information detected by the position detection unit 26, or the virtual camera image to be described later, together with the user ID for identifying the user of the HMD device 2, by the wireless communication unit 28.

The reception unit 201 receives the display image and the position information indicating the position to display the display image as a virtual image, which are transmitted from the transmission unit 304 of the information processing apparatus 3.

The display controller 202 controls the display unit 22, based on the display image and the position information received by the reception unit 201. That is, the display controller 202 controls so as to generate a display image for the right eye and a display image for the left eye, based on the display image and the position information received by the reception unit 201, display the display image for the right eye on the right transmissive display 221a, and display the display image for the left eye on the left transmissive display 221b so that the virtual image is viewed by the user of the HMD device 2 at the position corresponding to the position information.

Figure 4A:
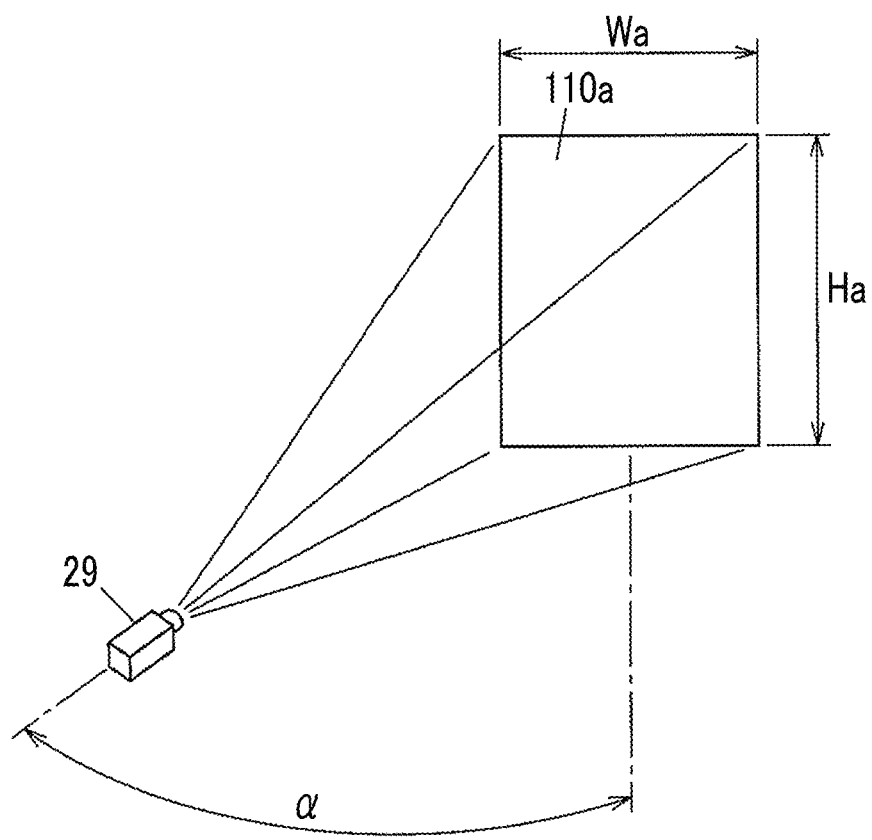
FIGS. 4A and 4B are diagrams for explaining the function of a virtual camera image generation unit.
Figure 4B:
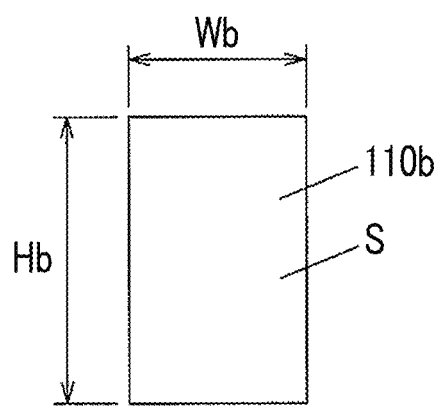

FIGS. 4A and 4B are diagrams for explaining the function of a virtual camera image generation unit 203. As shown in FIGS. 4A and 4B, the virtual camera image generation unit 203 generates a virtual camera image 110b (see FIG. 4B) to be obtained by virtually capturing the virtual image 110a (see FIG. 4A) by a virtual camera 29 virtually disposed at the eye position of the user of the HMD device 2, based on the display image and the position information transmitted from the information processing apparatus 3.

In a case where the gaze direction detected by the gaze detection unit 271 faces the virtual image 110a virtually displayed on the wall 100, the controller 20 causes the virtual camera image generation unit 203 to generate the virtual camera image 110b. Under the control of the controller 20, the virtual camera image generation unit 203 virtually captures the virtual image 110a by the virtual camera 29 to generate a virtual camera image 110b. Since the virtual camera image 110b is generated when the gaze direction faces the virtual image 110a, compared to the case where the virtual camera image is generated irrespective of the gaze direction, the degree of interest in the virtual image may be accurately calculated by the view determination unit 305. Although the accuracy of the degree of interest is reduced, the virtual camera image may be periodically generated irrespective of the gaze direction.

For example, in a case where the virtual camera 29 virtually captures the virtual image 110a from the direction inclined by the angle α in the horizontal direction from the center line of the virtual image 110a, the virtual camera image 110b generated by the virtual camera image generation unit 203 becomes a longer and narrower image than the original virtual image 110a, and the distortion rate (Hb/Wb) of the virtual camera image 110b increases with respect to the distortion rate (Ha/Wa) of the original virtual image 110a.

Configuration of Information Processing Apparatus

Figure 5:
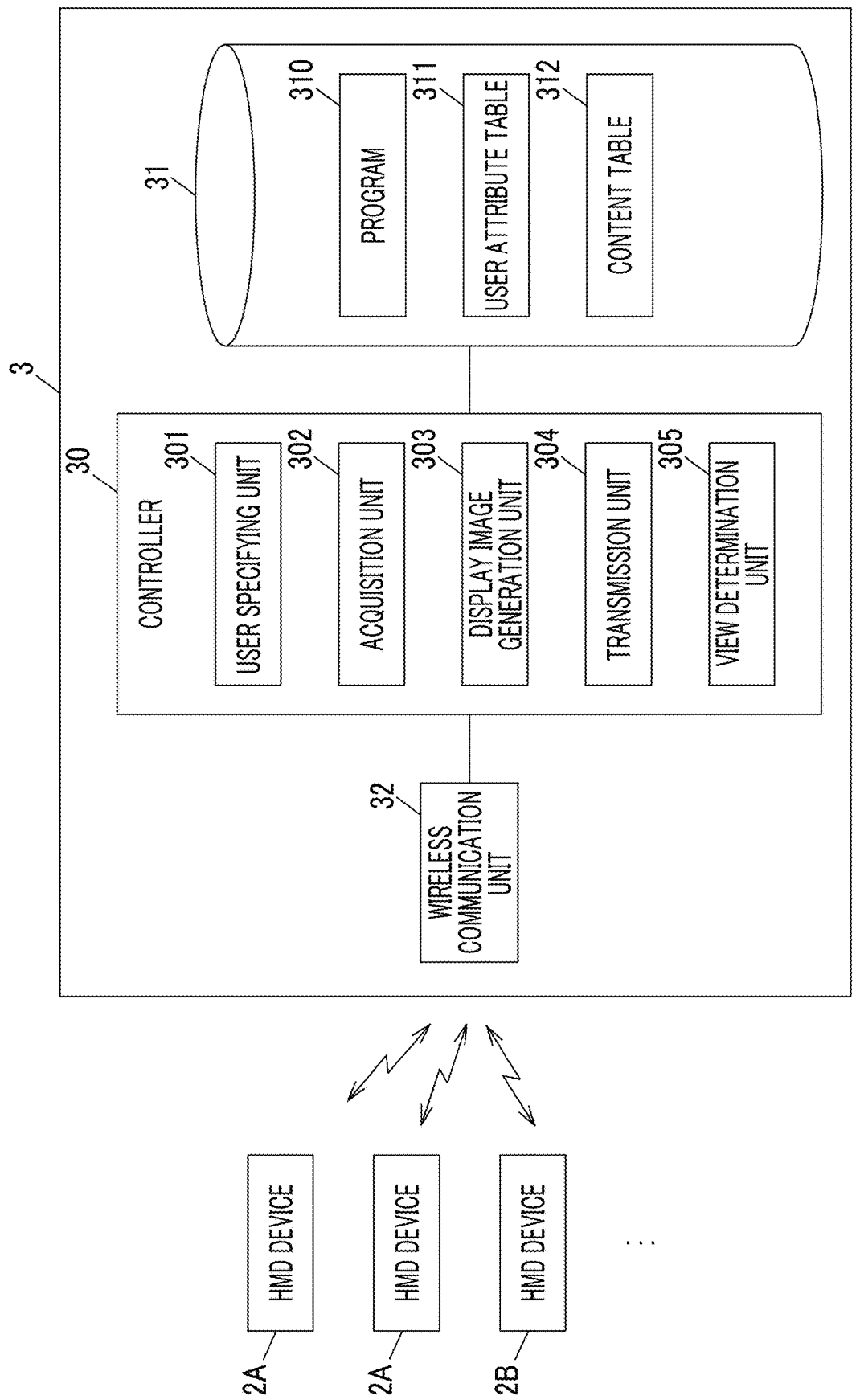
FIG. 5 is a block diagram showing an example of a control system of the information processing apparatus.

FIG. 5 is a block diagram showing an example of a control system of the information processing apparatus 3. The information processing apparatus 3 includes a controller 30 that controls each unit of the information processing apparatus 3, a memory 31 that stores various types of information, and a wireless communication unit 32 that performs wireless communication with each of the HMD devices 2.

The wireless communication unit 32 communicates with the HMD device 2 using, for example, a wireless LAN such as wireless fidelity (Wi-Fi), Wi-Fi direct, or short-range wireless communication such as Bluetooth (registered trademark), and infrared communication.

The controller 30 includes a central processing unit (CPU), an interface, and the like. The CPU functions as a reception unit 301, an acquisition unit 302, a display image generation unit 303, a transmission unit 304, a view determination unit 305, and the like by operating in accordance with the program 310. The display image generation unit 303 and the transmission unit 304 are an example of the instruction unit. Details of each of the units 301 to 305 will be described later.

The memory 31 includes a read only memory (ROM), a random access memory (RAM), a hard disk, and the like, and stores a program 310, a user attribute table 311 (see FIG. 5), a content table 312 (see FIG. 6), and the like. In the present specification, recording or registration is used in a case where information is written into a table, and storage is used in a case where information is written into a memory.

Configuration of User Attribute Table

FIG. 6 is a diagram showing an example of the user attribute table 311. User attribute information is recorded in advance in the user attribute table 311. The user attribute table 311 includes a "user ID" column in which a user ID is recorded, a "user name" column in which a user name is recorded, a "belonging department" column in which a department to which the user belongs is recorded, a "user type" column in which the type indicating whether the user is a regular employee, a temporary employee, a "content ID" column in which the content ID for identifying the content is recorded, and a "number of views" column in which the number of views of the content of the user is recorded. The user ID, the user name, the belonging department, and the user type are examples of personal attribute information. The belonging department is an example of a group. The content data and comment information are examples of the public information.

Configuration of Content Table

FIG. 7 is a diagram showing an example of the content table 312. The content table 312 includes a "content ID" column in which the content ID is recorded, a "content name" column in which the content name is recorded, a "public partner" column in which a partner (for example, a department or the like) who publishes content is recorded, a "user ID of content writer" column in which the user ID of the user who writes the content is recorded, a "position information" column in which position information indicating the position to publish the content as a virtual image is recorded, a "valid period" column in which a period during which viewing of content is valid is recorded, a "content data" column in which content data is recorded, and a "comment information" column in which comment information on the content is recorded. The "comment information" column has a "user ID" column in which the user ID of the user who adds the comment is recorded, and a "comment content" column in which the contents of the added comment are recorded.

A public partner recorded in the "public partner" column may be an organization to which an individual belongs or a group of a lower layer of the organization, an individual who belongs to an organization or a group, or an individual who does not belong to an organization or a group. In the "position information" column, for example, coordinates (x, y, z) indicating longitude, latitude, and altitude are recorded as the coordinates of the center of the virtual image. In a case where it is assumed that the height is determined according to the size of the virtual image, for example, coordinates (x, y) indicating longitude and latitude may be recorded as position information. In FIG. 7, in the "position information" column, $(x_1, y_1, z_1)$ indicating the position of the specific wall of the cafeteria is recorded with respect to the content ID "C1", and $(x_2, y_2, z_2)$ indicating the position of the specific wall of the lobby is recorded with respect to the content ID "C2". Further, the position information recorded in the "position information" column is the same as the position information included in the code image 101. The user ID and the comment recorded in the "comment information" column are an example of comment information. The content data and comment information are examples of public information registered in advance in association with position information. The specific wall of the cafeteria and the specific wall of the lobby are examples of predetermined places.

Next, each of the units 301 to 305 of the information processing apparatus 3 will be described.

The reception unit 301 receives the user ID, the virtual camera image, the face image, the voice data, the position information and various commands transmitted from the HMD device 2.

In a case where the reception unit 301 receives the command indicating the login request, the user ID and the code image 101, the acquisition unit 302 acquires the belonging department corresponding to the user ID from the user attribute table 311, and acquires position information by decoding the code image 101 received by the reception unit 301. The acquisition unit 302 acquires the content data including the acquired belonging department as a public partner, including the current time in the valid period, and corresponding to the acquired position information and the comment information, from the content table 312.

The display image generation unit 303 generates a display image to be displayed on the display unit 22 of the HMD device 2, for example, a display image including the content data and the comment information acquired by the acquisition unit 302.

The transmission unit 304 instructs the HMD device 2 to display the generated display image as a virtual image. Specifically, the transmission unit 304 transmits the display image generated by the display image generation unit 303 and the position information to display the display image as a virtual image to the HMD device 2.

Figure 3:
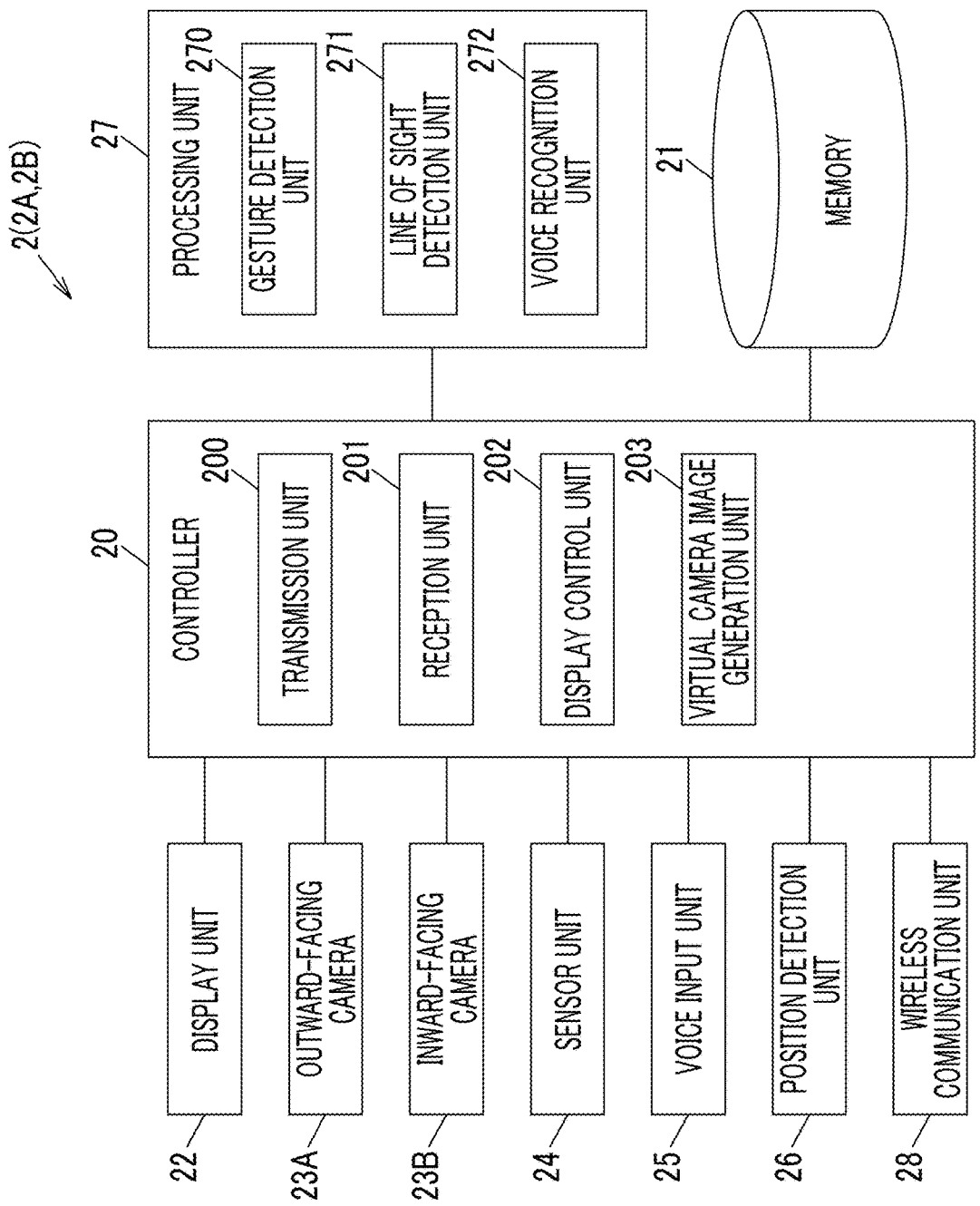
FIG. 3 is a diagram showing an example of a control system of the HMD device.

The view determination unit 305 calculates the degree of interest in the virtual image 110a based on the virtual camera image 110b (see FIG. 3) transmitted from the HMD device 2. Specifically, when the area of the virtual camera image 110b is S, the length of the long side is Hb, the length of the short side is Wb, and the distortion rate is kb (=Hb/Wb), the view determination unit 305 calculates the degree of interest I in the virtual image 110a of the user of the HMD device 2 by the following Equation (1).

$$I = kb \times S \quad (1)$$

That is, the degree of interest I increases as the distortion rate kb decreases, and increases as the area S increases. In other words, in a case where the user of the HMD device 2 is viewing the virtual image 110a from the front at a close place, the degree of interest I increases, which indicates that the virtual image 110a is of interest. The view determination unit 305 determines that the virtual image 110a is being viewed in a case where the degree of interest I is equal to or greater than the threshold value, and counts the number of views. Thus, in a case of viewing the virtual image 110a from a diagonal direction or from a distance, in a case where the degree of interest in the virtual image 110a is less than the threshold value, it is not determined that the virtual image 110a has been viewed, and the number of views Is not counted.

Note that the degree of interest may be calculated using only one of the distortion rate and the area, or may be calculated by the following Equation (2).

$$I = A \cdot kb + B \cdot S \quad (2)$$

Here, A and B are positive coefficients.

Further, the degree of interest may be calculated based on the time during which the user views the virtual image 110a, that is, the capturing time of the virtual camera image 110b. In this case, the longer the capturing time is, the higher the degree of interest is, and the shorter the capturing time, the smaller the degree of interest.

Operation of First Exemplary Embodiment

Next, an example of the operation of the information processing system 1 will be described with reference to FIG. 8 and the flowchart of FIG. 9.

(1) Login

For example, in a case where the first person using the HMD device 2A moves his or her hand to perform a gesture (first gesture) instructing capturing of the code image 101 shown in FIG. 1, the gesture detection unit 270 of the HMD device 2A detects the first gesture from the range image acquired by the range image sensor of the sensor unit 24, and transmits a first command corresponding thereto, to the controller 20.

The controller 20 controls the outward-facing camera 23A to capture the code image 101, based on the first command from the gesture detection unit 270. The controller 20 stores the captured code image 101 in the memory 21.

Next, in a case where the first person using the HMD device 2A moves his or her hand to perform a gesture (second gesture) instructing login, the gesture detection unit 270 of the HMD device 2A detects the second gesture from the range image acquired by the range image sensor of the sensor unit 24, and transmits a second command corresponding thereto, to the controller 20.

The transmission unit 200 of the HMD device 2A transmits the login request to the information processing apparatus 3 together with the code image 101 and the user ID for identifying the user.

The reception unit 301 of the information processing apparatus 3 receives the login request, the code image 101 and the user ID transmitted from the HMD device 2A (Yes in S1).

(2) Acquisition of Content

The acquisition unit 302 acquires the belonging department corresponding to the user ID received by the reception unit 301 from the user attribute table 311, and acquires position information by decoding the code image 101 received by the reception unit 301.

The acquisition unit 302 determines whether or not the contents including the acquired belonging department as a public partner, including the current time in the valid period, and corresponding to the acquired position information are included in the content table 312 (S2).

In the case where the contents including the acquired belonging department as a public partner, including the current time in the valid period, and corresponding to the acquired position information are included in the content table 312 (Yes in S2), the corresponding content data and the comment information are acquired from the content table 312. For example, in a case where the user ID of the first person who has logged in is "user 002", the belonging department "intellectual property" is acquired from the user attribute table 311. In the case where the position information indicated by the code image 101 is "a specific wall of the cafeteria", as shown in FIG. 7, since the content having "intellectual property" as a public partner and the position information of "a specific wall of the cafeteria", of which the content ID is "content a" and the content name is "xx project participant recruitment", is included in the content table 312, the acquisition unit 302 acquires this content data and the comment information from the content table 312.

(3) Generation of Display Image

The display image generation unit 303 generates a display image, based on the content data and the comment information acquired by the acquisition unit 302 (S7). The display image is a two-dimensional image including contents and comment information.

(4) Transmission of Display Image and Position Information

The transmission unit 304 transmits the display image generated by the display image generation unit 303 and the position information acquired by the acquisition unit 302 to the HMD device 2A used by the first person (S4).

The display controller 202 of the HMD device 2A controls the display unit 22 so as to display the display image as a virtual image 110a on the wall 100 of the cafeteria, based on the display image and the position information.

Figure 8:
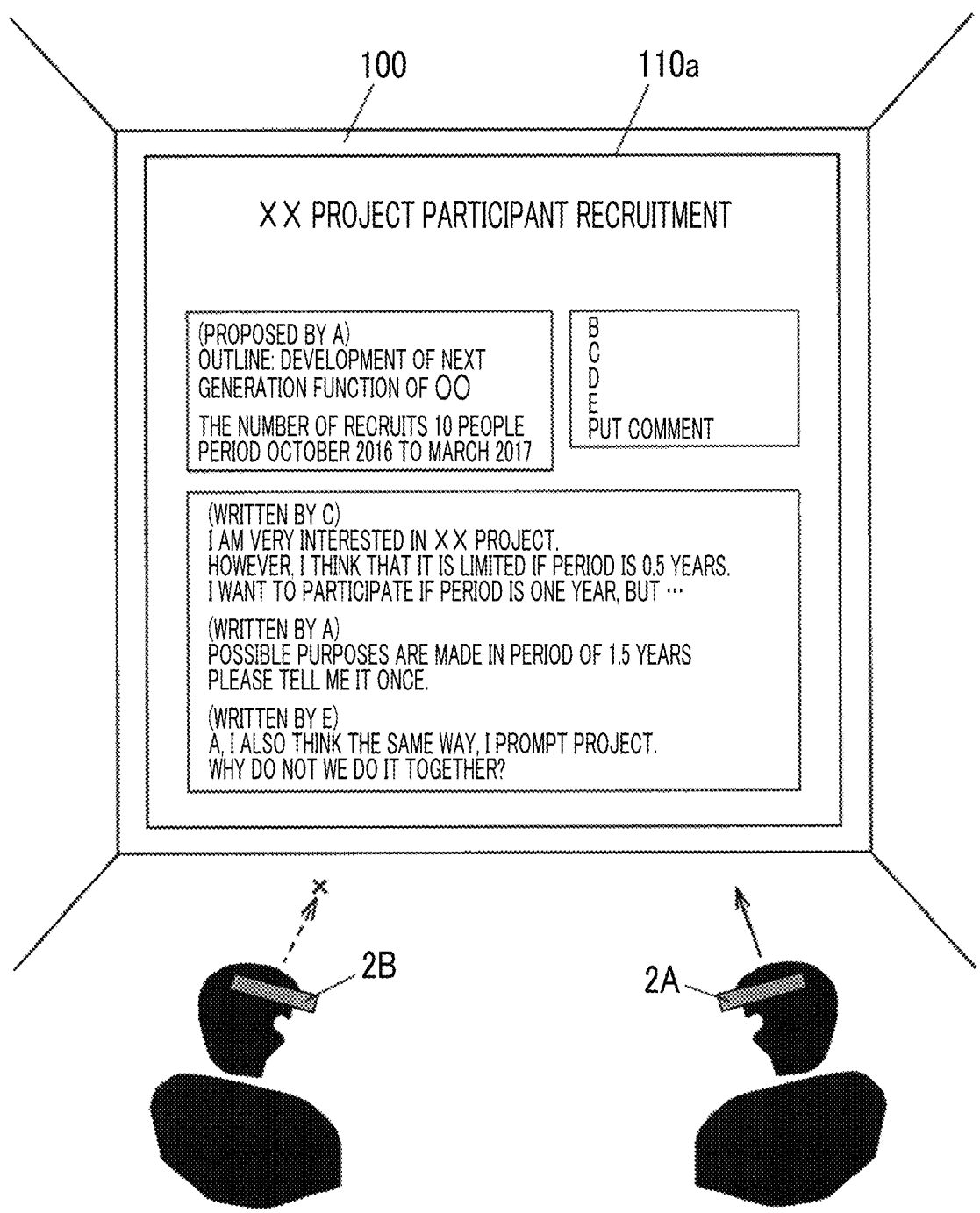
FIG. 8 is a diagram showing a display example of a virtual image.
Figure 9:
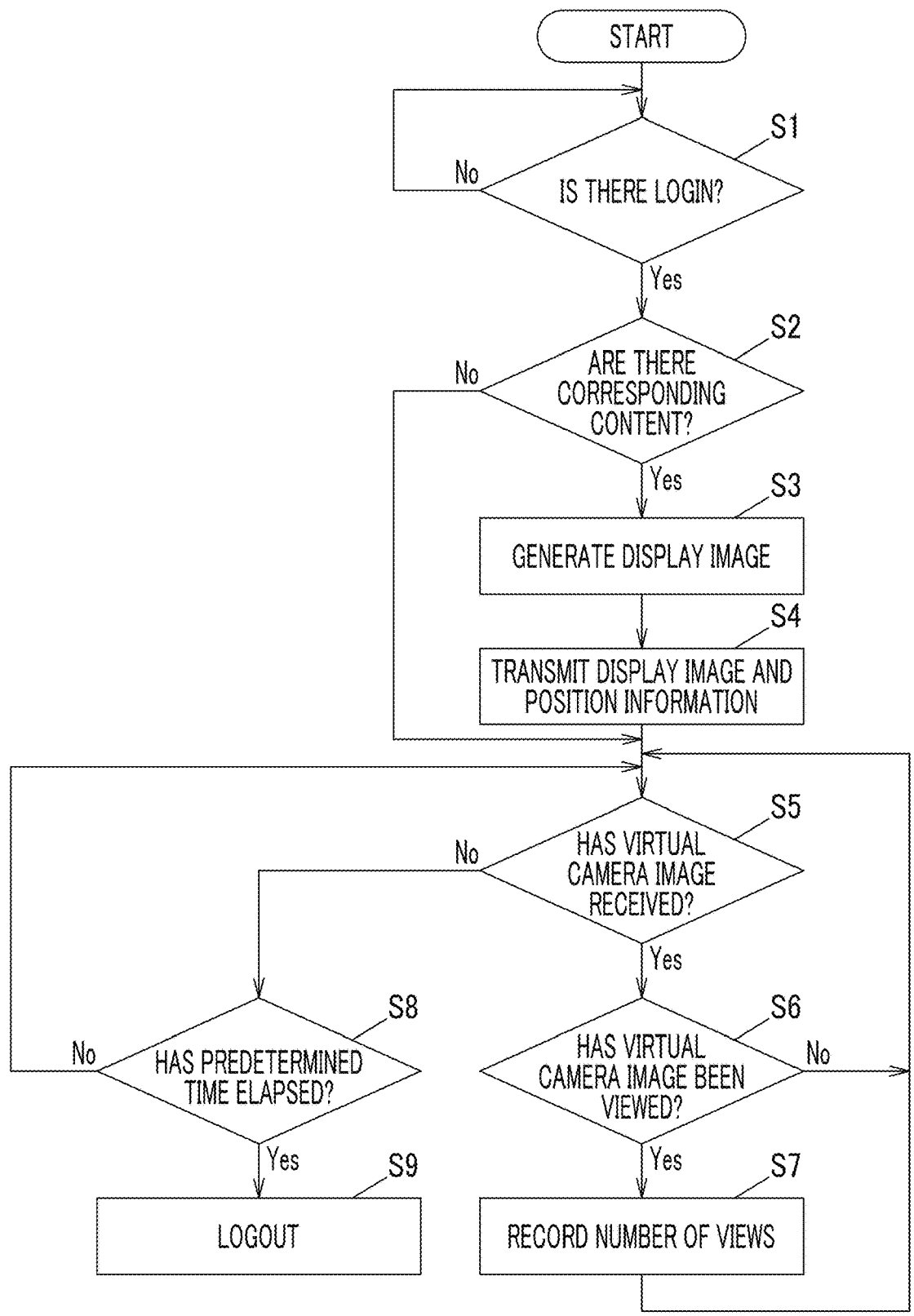
FIG. 9 is a flowchart showing an example of an operation of the information processing apparatus according to the first exemplary embodiment.

FIG. 8 is a diagram showing a display example of a virtual image. The virtual image 110a shown in FIG. 8 includes, for example, the name of the proposer, the outline of recruitment, the number of recruits and the recruitment period as content data and includes the name of a person who adds the comment on the content and contents of the comment, as comment information.

For example, the first person wearing the HMD device 2A views, as shown in FIG. 8, a virtual image 110a including the content data and comment information of "recruitment of XX project participant recruitment" displayed on the specific wall 100 of the cafeteria, but for example, the second person wearing the HMD device 2B who belongs to the same organization as that of the first person but a different group from that of the first person does not view the virtual image 110a. Therefore, it is possible to share information with a specific person whose group is common in a specific place. Since it is possible to designate a group as a public partner, it becomes easier to specify a public partner as compared to a case of specifying individuals individually as public partners. The virtual image may be displayed in the vicinity of a specific place. In this case, it becomes possible to view a specific place and a virtual image at the same time.

Figure 10:
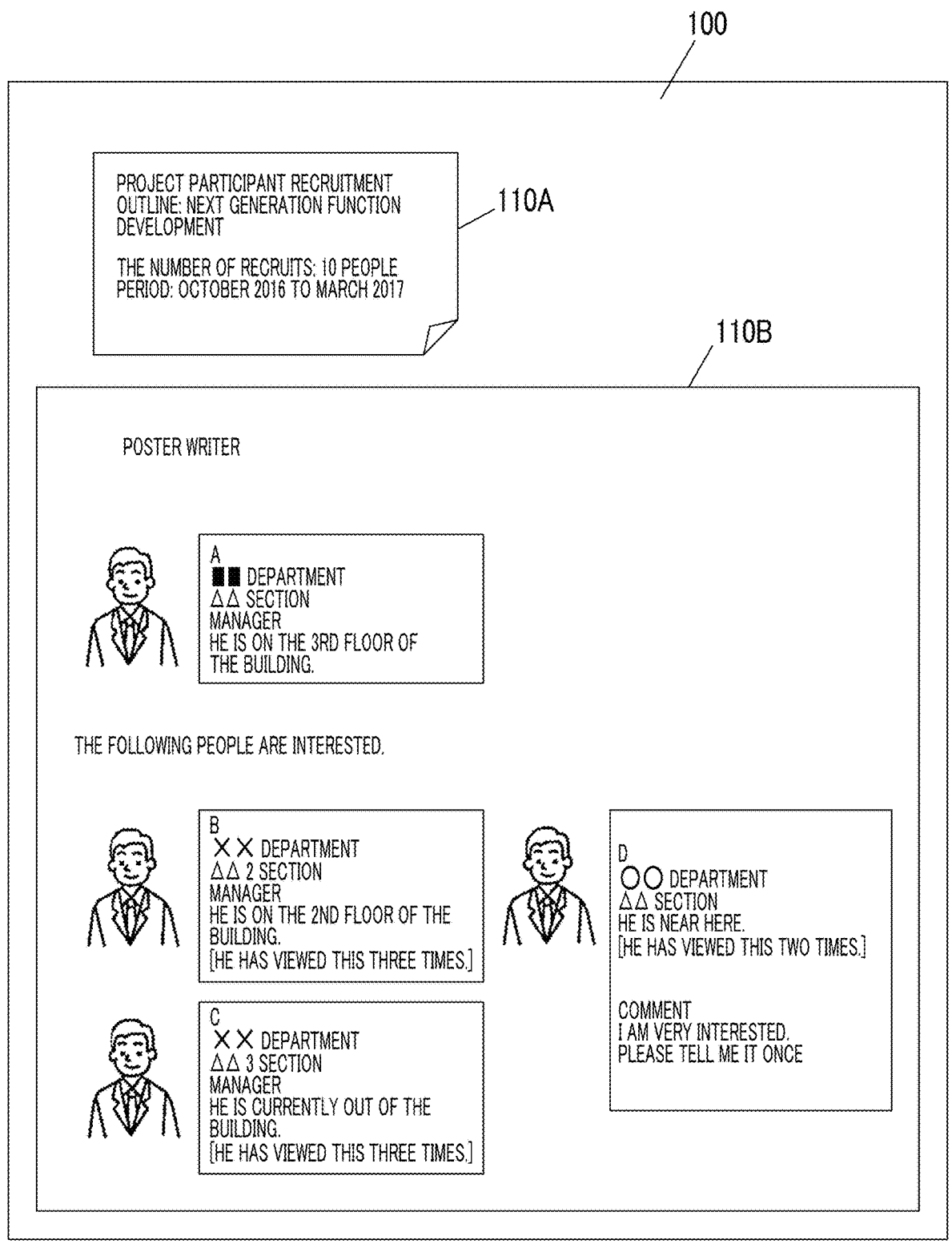
FIG. 10 is a diagram showing a display example of a virtual image.

FIG. 10 is a diagram showing another display example of a virtual image. As shown in FIG. 10, a first virtual image 110A including content data and a second virtual image 110B including comment information may be displayed on the wall 100 of the cafeteria.

In the case shown in FIG. 10, the first virtual image 110A includes, for example, a content name, an outline of recruitment, the number of recruits and the recruitment period. The second virtual image 110B includes, for example, the attribute information of the person who views the content, the current position of the person who views the content, the number of views, and the comment content. With respect to the current position of the person who views the content, the information processing apparatus 3 may acquire the position information of the HMD device 2 from the HMD device 2 used by the person.

(5) Recording of Number of Views

Next, the reception unit 301 determines whether or not the virtual camera image 110b has been received from the HMD device 2A used by the first person who has logged in (S5). In a case where the first person using the HMD device 2A views the virtual image 110a virtually displayed on the wall 100, the gaze detection unit 271 detects the gaze direction to the virtual image 110a and transmits the gaze direction to the controller 20.

In a case where the gaze direction detected by the gaze detection unit 271 faces the virtual image 110a virtually displayed on the wall 100, the controller 20 causes the virtual camera image generation unit 203 to generate the virtual camera image 110b. The virtual camera image generation unit 203 virtually disposes the virtual camera 29 in the eye of the first person who uses the HMD device 2A and generates the virtual camera image 110b obtained by the virtual camera 29 virtually capturing the virtual image 110a.

The transmission unit 200 of the HMD device 2 transmits the virtual camera image 110b generated by the virtual camera image generation unit 203 to the information processing apparatus 3 together with the user ID.

In a case where the reception unit 301 of the information processing apparatus 3 receives the virtual camera image 110b together with the user ID (Yes in S5), the view determination unit 305 determines whether or not the virtual image 110a has been viewed based on the virtual camera image 110b as described above (S6). In a case where it is determined that the virtual image 110a has been viewed (Yes in S6), the view determination unit 305 updates the number of views corresponding to the user in the "number of views" column of the user attribute table 311 based on the user ID and the content ID (S7).

In a case where the virtual camera image 110b is not received in step S5 even in a case where the predetermined time has elapsed (Yes in S8), the HMD device 2A is forcibly logged out (S9).

Calculation Example of Number of Views

Figure 11:
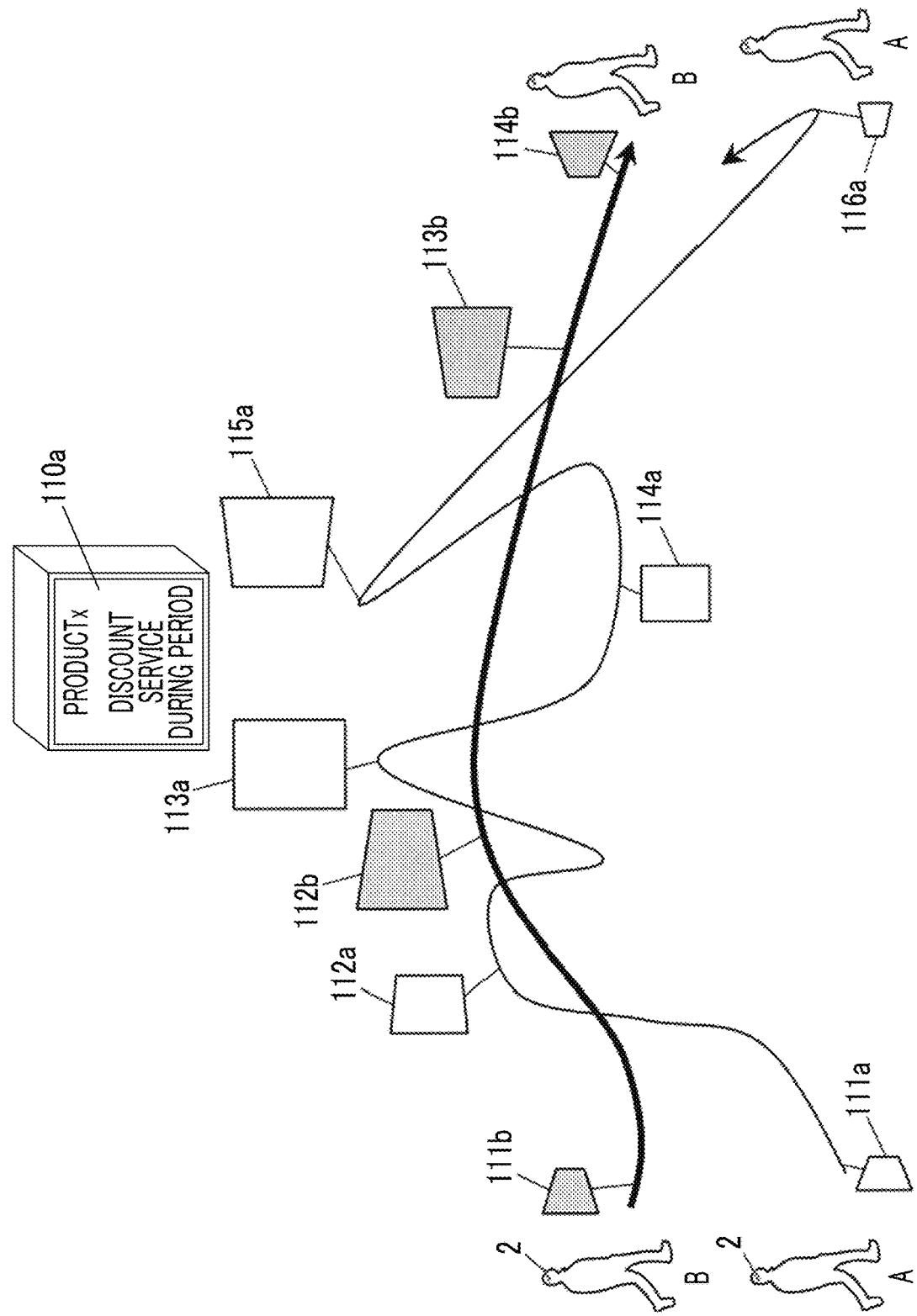
FIG. 11 is a diagram for explaining the number of views.

FIG. 11 is a diagram for explaining an example of calculation of the number of views by the view determination unit 305. In FIG. 11, reference numerals 111a to 116a denote virtual camera images virtually captured by the HMD device 2 used by the user A. In FIG. 11, reference numerals 111b to 114b denote virtual camera images virtually captured by the HMD device 2 used by the user B. The view determination unit 305 determines viewing as follows.

The users A and B pass in front of the place where the virtual image 110a is displayed from the left side to the right side in FIG. 10. The user A approaches the virtual image 110a three times while passing in front of the place where the virtual image 110a is displayed, and the user B is not as close as the user A but approaches the virtual image 110a once.

The virtual camera image 112a when A first approaches the virtual image 110a has a large distortion rate and a small area, so it is not determined that the virtual camera image 112a has been viewed. The virtual camera image 113a when A approaches the virtual image 110a for the second time has a small distortion rate and a large area, so it is determined that the virtual camera image 113a has been viewed. The virtual camera image 115a when A approaches the virtual image 110a for the third time has a large area and a large distortion rate, so it is not determined that the virtual camera image 115a has been viewed. The virtual camera image 112b when B is closest to the virtual image 110a has a small area and a large distortion rate, so it is not determined that the virtual camera image 112b has been viewed.

Modification Example of Position Information

In the above exemplary embodiment, the code image 101 is used to indicate a predetermined place, but position information indicating the position of the HMD device 2 may be used. That is, in a case where the distance between the position indicated by the position information recorded in the "position information" column of the content table 312 and the position of the HMD device 2 is equal to or less than a predetermined value (for example, 3 m), the corresponding content data and comment information may be acquired from the content table 312, and a virtual image may be generated and displayed. According to the modification example, the code image can be omitted.

Second Exemplary Embodiment

Figure 12:
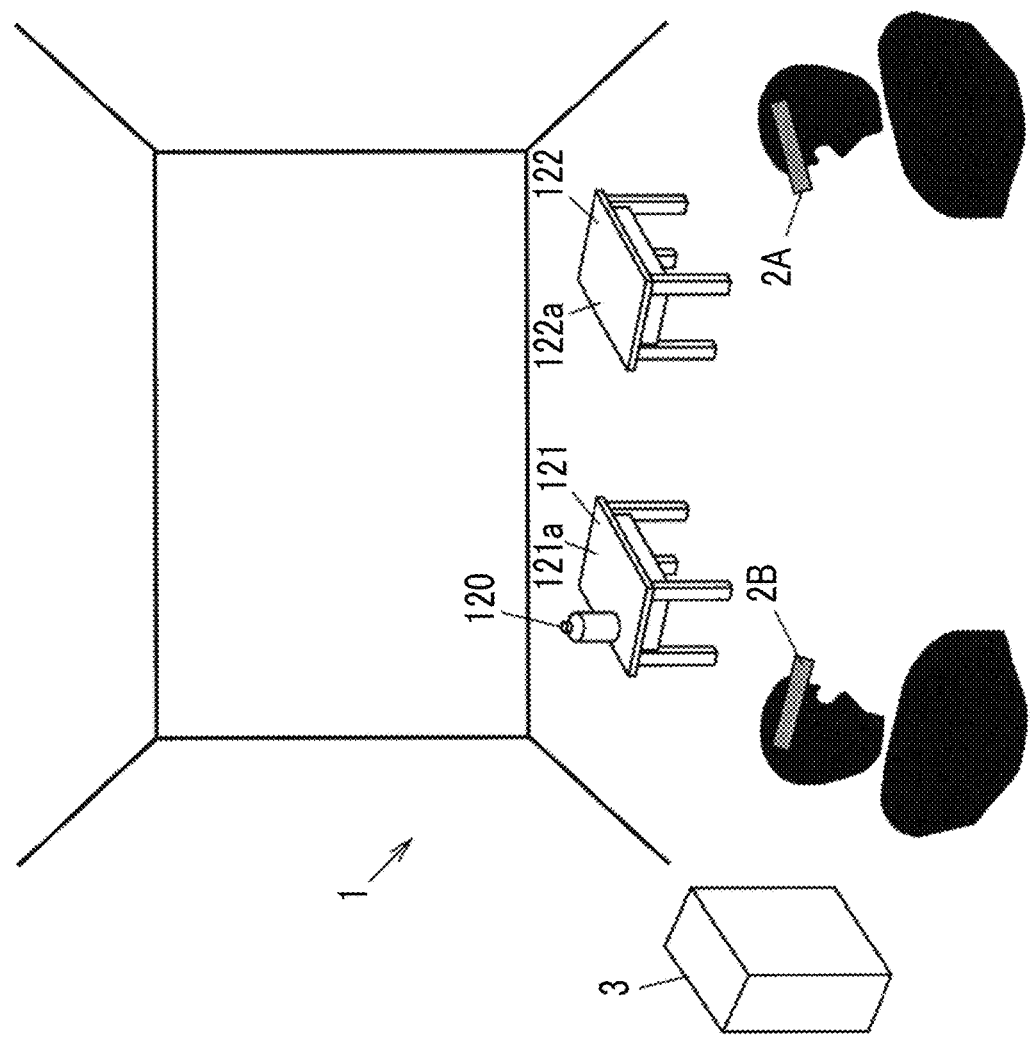
FIG. 12 is a diagram illustrating a configuration example of an information processing system according to a second exemplary embodiment of the present invention.

FIG. 12 is a diagram illustrating a configuration example of an information processing system according to a second exemplary embodiment of the present invention. In the first exemplary embodiment, the public information is associated with the position information indicating the position of a predetermined place. However, in the present exemplary embodiment, it is assumed that the public information is associated with the position information indicating the position of a predetermined place and feature information of an object placed at the place. The object is a movable object such as a beverage bottle, a portable information terminal device or the like, for example. Hereinafter, a difference from the first exemplary embodiment will be mainly described.

Similar to the first exemplary embodiment, the information processing system 1 includes an HMD device 2A used by a first person, an HMD device 2B used by a second person, and an information processing apparatus 3.

FIG. 12 shows a state in which, for example, a first person wears an HMD device 2A and a second person wears an HMD device 2B in the common room of an office. In the common room, plural tables 121 and 122 are disposed, the object 120 is placed on the upper surface 121a of one table 121, but nothing is placed on the upper surface 122a of the other table 122. The table 121 on which the object 120 is placed is an example of a predetermined place (also is referred to as a specific place).

Figure 13:
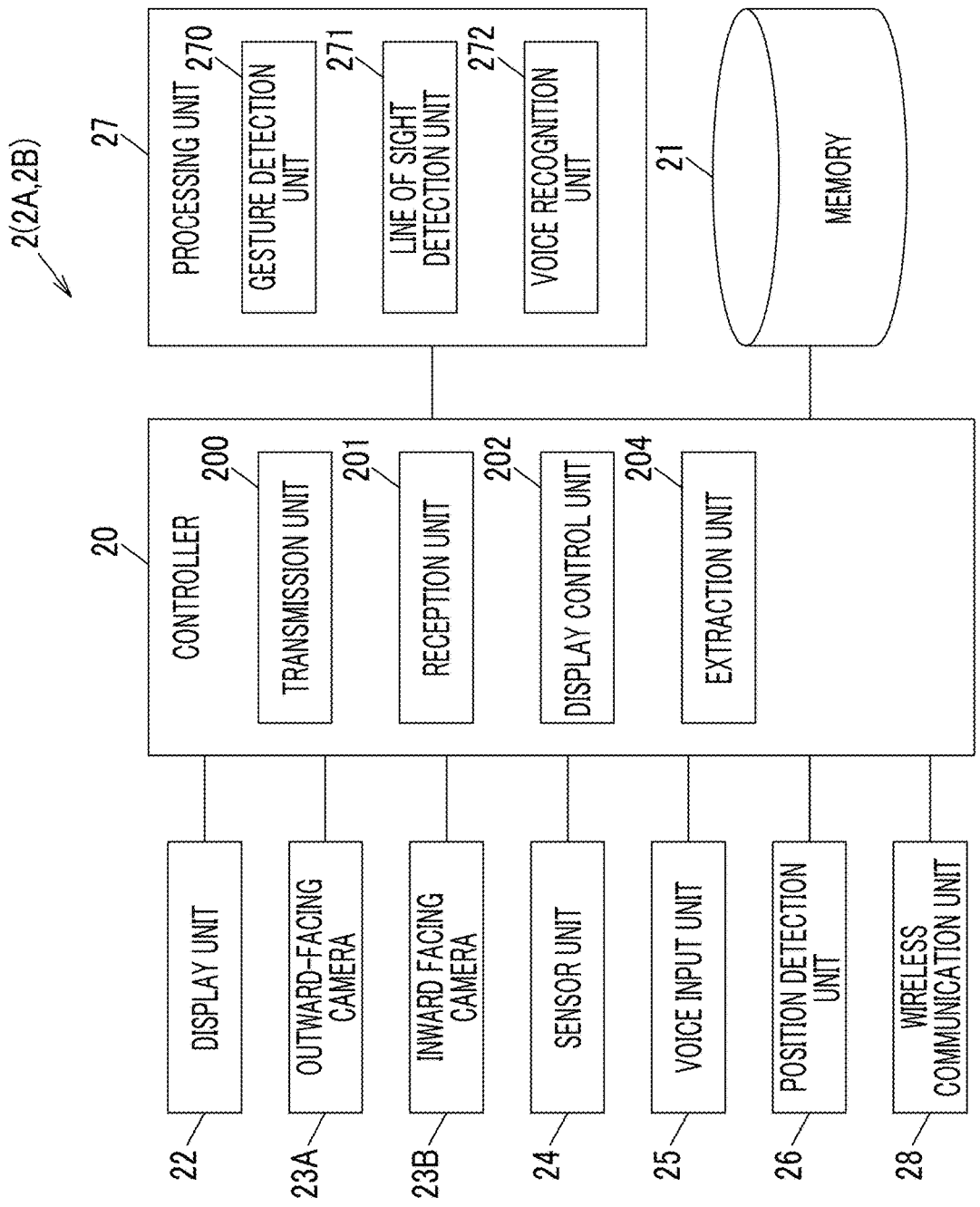
FIG. 13 is a diagram illustrating an example of a control system of an HMD device according to the second exemplary embodiment.

FIG. 13 is a diagram illustrating an example of a control system of an HMD device 2 according to the second exemplary embodiment. The HMD device 2 of the present exemplary embodiment is different from the HMD device 2 of the first exemplary embodiment in that the controller 20 does not include the virtual camera image generation unit 203 but includes the extraction unit 204.

The controller 20 of the HMD device 2 includes a central processing unit (CPU), an interface, and the like. The CPU functions as a transmission unit 200, a reception unit 201, a display controller 202, an extraction unit 204, and the like by operating in accordance with the program stored in the memory 21.

In the message registration mode, the extraction unit 204 extracts the feature information (shape, color, or the like) of the object 120 from the image of the object 120 captured by the outward-facing camera 23A and stores the extracted feature information in the memory 21.

In the message registration mode, the transmission unit 200 transmits the voice data recognized by the voice recognition unit 272 and the feature information stored in the memory 21 to the information processing apparatus 3 together with the user ID. The voice data, the feature information and the user ID transmitted to the information processing apparatus 3 are registered in the object table 313.

Figure 14:
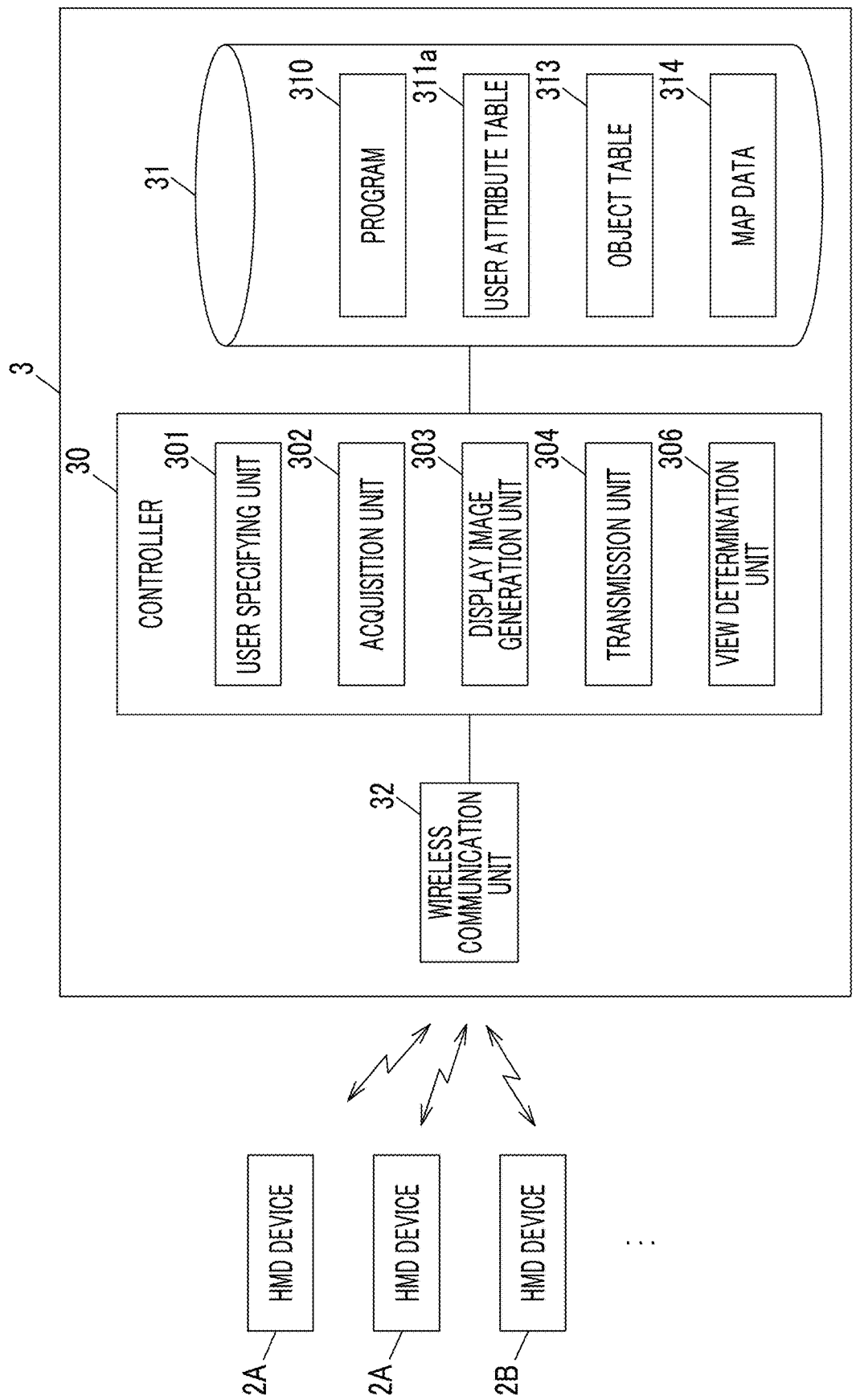
FIG. 14 is a block diagram illustrating an example of a control system of an information processing apparatus according to the second exemplary embodiment.

FIG. 14 is a block diagram illustrating an example of a control system of an information processing apparatus according to the second exemplary embodiment. The information processing apparatus 3 of the present exemplary embodiment is different from the information processing apparatus 3 of the first exemplary embodiment in that it does not include the view determination unit 305 but includes the registration unit 306.

Similar to the first exemplary embodiment, the information processing apparatus 3 includes a controller 30, a memory 31, and a wireless communication unit 32.

The controller 30 includes a central processing unit (CPU), an interface, and the like. The CPU functions as a reception unit 301, an acquisition unit 302, a display image generation unit 303, a transmission unit 304, a registration unit 306, and the like by operating in accordance with the program 310.

The registration unit 306 registers necessary information in the object table 313 (see FIG. 16) based on the feature information, the voice data and the user ID transmitted from the HMD 2A used by the first person. Details of how to register will be described later.

The memory 31 includes a read only memory (ROM), a random access memory (RAM), a hard disk, and the like, and stores a program 310, a user attribute table 311a (see FIG. 15), an object table 313 (see FIG. 16), map data 314 and the like.

Similar to the user attribute table 311 of the first exemplary embodiment, the user attribute table 311a includes a "user ID" column, a "user name" column, a "belonging department" column, and a "user type" column, but does not include a "content ID" column and a "number of views" column.

The map data 314 includes the names of spaces where the HMD device 2 can move, for example, plural places which are spaces in the building and in which objects are placed, and position information indicating the positions of the places. There may be only one such place.

Configuration of Object Table

FIG. 16 is a diagram showing an example of the object table 313. The object table 313 includes an "object ID" column in which an object ID identifying an object is recorded, a "feature information" column in which feature information of the object is recorded, a "position information" column in which position information indicating the position of a place the object is placed is recorded, a "valid period" column in which a valid period to publish messages is recorded, a "public partner" column in which a public partner is recorded, a "user ID of a message grantor" column in which the user ID of a message grantor is recorded, and a "message" column in which a granted message is recorded. The granted message may be a text, a voice signal, an image or a moving image, or a combination thereof. In the case shown in FIG. 12, since the object 120 is placed on the upper surface 121a of the table 121, the position information of the upper surface 121a of the table 121 is recorded in the "position information" column. By linking the message with the position information and the feature information of the object 120, even in a case where plural objects are present in the same place (for example, the table 121), it becomes possible to display the message as a virtual image for each object.

Operation of Second Exemplary Embodiment

Next, an example of the operation of the information processing system 1 will be described with reference to FIG. 17 and the flowchart of FIG. 18.

(1) Message Registration

For example, in a case where the first person using the HMD device 2A moves his or her hand to perform a gesture (third gesture) instructing to register a message in association with the object 120, the gesture detection unit 270 of the HMD device 2A detects the third gesture from the range image acquired by the range image sensor of the sensor unit 24, and transmits a third command corresponding thereto, to the controller 20.

The controller 20 proceeds to a message registration mode, based on the third command from the gesture detection unit 270. In the message registration mode, the controller 20 controls the outward-facing camera 23A to capture the object 120 placed on the upper surface 121a of the table 121, for example. The extraction unit 204 of the controller 20 extracts the feature information of the object 120 from the captured image of the object 120. The extraction unit 204 stores the extracted feature information in the memory 21.

Next, the first person inputs the message to be registered, the valid period, the position of the table 121, and the public partner, in association with the object 120, to the voice input unit 25 by voice. The voice input unit 25 inputs the voice of the first person as a voice signal. The voice recognition unit 272 converts the input voice signal into voice data and stores it in the memory 21. For example, as shown in FIG. 17, in a case of talking "This is mine. Please do not drink.", the message is registered in the object table 313 of the information processing apparatus 3.

The transmission unit 200 transmits the feature information of the object 120 and the voice data stored in the memory 21 to the information processing apparatus 3 together with the user ID for identifying the user.

The registration unit 306 of the information processing apparatus 3 records the feature information, the voice data and the user ID transmitted from the HMD device 2A used by the first person in the object table 313. Specifically, the registration unit 306 issues an object ID, registers the object ID in the "object ID" column, the feature information in the "feature information" column, and the user ID in the "user ID of a message grantor" column, and registers the valid period, the public partner and the message included in the voice data in the "valid period" column, the "public partner" column, and the "message" column, respectively. The position information corresponding to the position included in the voice data is acquired from the map data 314, and the acquired position information is registered in the "position information" column.

(2) Reception of Image of Object

In a case where a first person belonging to the same group as the first person who registers the message moves his or her hand with wearing the HMD device 2A to perform a gesture (fourth gesture) instructing to capture the object 120 placed on the upper surface 121a of the table 121, the gesture detection unit 270 of the HMD device 2A detects the fourth gesture from the range image acquired by the range image sensor of the sensor unit 24, and transmits a fourth command corresponding thereto, to the controller 20.

The controller 20 controls the outward-facing camera 23A to capture the object 120, based on the fourth command from the gesture detection unit 270. The extraction unit 204 extracts the feature information of the object 120 from the image of the object 120 and stores it in the memory 21. The transmission unit 200 of the controller 20 transmits the feature information stored in the memory 21 to the information processing apparatus 3 together with the position information of the HMD device 2A and the user ID.

The reception unit 301 of the information processing apparatus 3 receives the feature information, position information, user ID of the object 120 transmitted from the HMD device 2A (Yes in S1).

(3) Acquisition of Granted Message

The acquisition unit 302 determines whether or not the feature information of the object 120 and the position information received by the reception unit 301 are recorded in the object table 313 (S12). In a case where the distance between the position indicated by the position information recorded in the object table 313 and the position indicated by the position information transmitted from the HMD device 2 is equal to or less than a predetermined distance (for example, 3 m), the acquisition unit 302 determines that the position information transmitted from the HMD device 2 is recorded in the object table 313.

In a case where the feature information of the object 120 is recorded in the object table 313 (Yes in S12), the acquisition unit 302 acquires from the object table 313 the information necessary for generating the virtual image (S13). That is, in a case where the current time is included in the valid period, the acquisition unit 302 acquires position information, a public partner, a user ID of the message granter and a message from the object table 313.

(4) Generation of Display Image

The display image generation unit 303 generates a display image, from the information acquired by the acquisition unit 302 (S14). In the case shown in FIG. 17, the display image includes, in addition to the message, for example, "to members of oo group" and information on the sender of the message "from xx", as the information on the public partner.

The display image is a two-dimensional image.

(5) Transmission of Display Image and Position Information

The transmission unit 304 transmits the display image generated by the display image generation unit 303 and the position information to the HMD device 2 of a public partner (S15).

The display controller 202 of the HMD device 2 controls the display unit 22 so as to display the display image as a virtual image 110a in the vicinity of the object, based on the display image and the position information.

Figure 17:
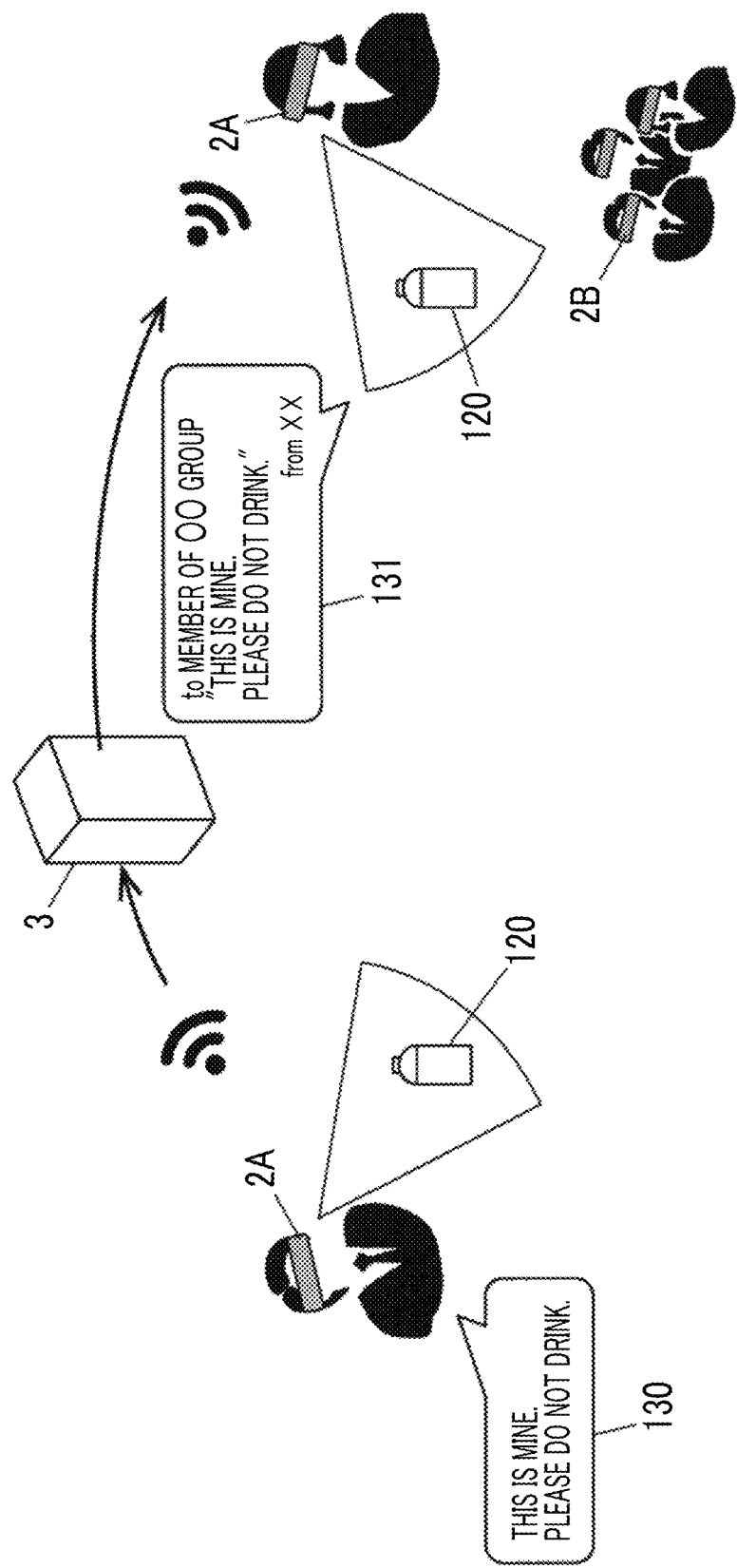
FIG. 17 is a diagram showing an example of a virtual image virtually displayed in the vicinity of an object.
Figure 18:
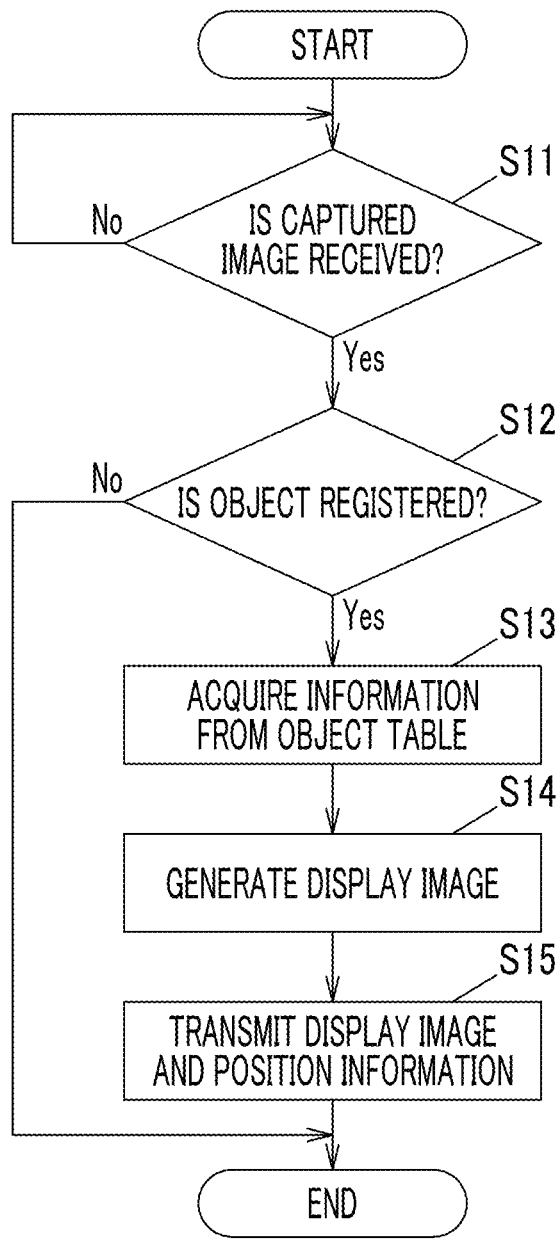
FIG. 18 is a flowchart showing an example of an operation of the information processing apparatus according to the second exemplary embodiment.

For example, the first person views, as shown in FIG. 17, the virtual image 110a including information on "to member of oo group "This is mine. Please do not drink." from xx" virtually displayed in the vicinity of object, but the second person who belongs to the same organization as the first person but a different group does not view the virtual image 110a.

Therefore, it is possible to share information with a specific person through a specific place.

Modification Example 1

FIGS. 19A to 19E are diagrams for explaining a modification example. In the second exemplary embodiment, in a case of registering a message, a transition is made to the message registration mode with a gesture, extraction of feature information and input of voice are performed in the message registration mode, but in Modification Example 1, the processing is sequentially performed every time the user's hand of the HMD device 2 touches the object 120. It is assumed that the object 120 is placed on the upper surface 121a of the table 121.

As shown in FIG. 19A, in a case where the hand of A who is the user of the HMD device 2A touches the object 120, the object 120 is captured and feature information is extracted from the captured image.

In other words, the gesture detection unit 270 of the HMD device 2A detects the gesture indicating that the hand touches the object 120 from the range image acquired by the range image sensor of the sensor unit 24, and transmits a command corresponding thereto to the controller 20. The controller 20 controls the outward-facing camera 23A to capture the image of the object 120, based on the command from the gesture detection unit 270. The extraction unit 204 extracts the feature information of the object 120 from the image of the object 120 captured by the outward-facing camera 23A and stores it in the memory 21.

Next, as shown in FIG. 19B, in a case where the hand of A who is the user of the HMD device 2A touches the object 120, a message (for example, "Thank you for your hard work.") 140 and the like are input by voice.

In other words, the gesture detection unit 270 of the HMD device 2A detects the gesture indicating that the hand touches the object 120 from the range image acquired by the range image sensor of the sensor unit 24, and transmits a command corresponding thereto to the controller 20. Based on the command from the gesture detection unit 270, the controller 20 inputs the user's voice by the voice input unit 25, converts it into voice data by the voice recognition unit 272, and stores the voice data in the memory 21.

Next, as shown in FIG. 19C, in a case where the hand of A who is the user of the HMD device 2A touches the object 120, the feature information, the voice data such as the message and the user ID are transmitted to the information processing apparatus 3.

In other words, the gesture detection unit 270 of the HMD device 2A detects the gesture indicating that the hand touches the object 120 from the range image acquired by the range image sensor of the sensor unit 24, and transmits a command corresponding thereto to the controller 20. The transmission unit 200 of the controller 20 transmits the feature information and the voice data stored in the memory 21 together with the user ID to the information processing apparatus 3.

The registration unit 306 of the information processing apparatus 3 records the feature information, the voice data and the user ID transmitted from the HMD device 2A in the object table 313.

Next, as shown in FIG. 19D, the object 120 is captured by HMD device 2B used by B and feature information is extracted.

In other words, in a case where B who is the user of the HMD device 2B moves his or her hand to perform an operation instructing capturing of the object 120, the gesture detection unit 270 of the HMD device 2B detects the gesture instructing capturing of the object 120 from the range image acquired by the range image sensor of the sensor unit 24, and transmits a command corresponding thereto, to the controller 20.

The controller 20 controls the outward-facing camera 23A to capture the image of the object 120, based on the command from the gesture detection unit 270. The extraction unit 204 extracts the feature information of the object 120 from the image of the object 120 captured by the outward-facing camera 23A. The transmission unit 200 transmits the extracted feature information together with the user ID of B to the information processing apparatus 3.

Next, as shown in FIG. 19E, the display image generation unit 303 generates a display image. The transmission unit 304 transmits the display image and the position information to the HMD device 2B used by B.

The display controller 202 of the HMD device 2B controls the display unit 22 so as to display the virtual image 141 for B. In the case shown in FIG. 19E, B views a virtual image 141 "From A, thank you for your hard work." including the name of the message grantor and the message.

In the second exemplary embodiment, in a case where the movable object disappears from a predetermined place, based on the voice data from the HMD device 2 indicating that the object has disappeared, the controller 30 of the information processing apparatus 3 may delete the message or the like associated with the place from the object table 313. Further, in a case where there are plural objects that are movable to the same specific place and have the same feature information, the object may be specified based on the relative positional relationship of the movable objects.

In the second exemplary embodiment, the feature information of the object is extracted by the HMD device 2, but it may be extracted by the information processing apparatus 3. In this case, the HMD device 2 transmits the image of the object to the information processing apparatus 3, and the controller 30 of the information processing apparatus 3 extracts the feature information of the object 120 from the image of the object 120.

Although the exemplary embodiments of the present invention have been described above, the exemplary embodiments of the present invention are not limited to the above exemplary embodiments, and various modifications and implementations are possible within the scope not changing the gist of the present invention. For example, in each exemplary embodiment, the head mounted display device of a light transmission type has been described as a display device. However, the present invention can be similarly applied to a portable information terminal such as a smartphone that displays a display image as a virtual image so as to be superimposed on an image obtained by capturing a real space (outside scene).

Further, a part of the functions of the information processing apparatus 3 may be transferred to the HMD device 2, and a part of the functions of the HMD device 2 may be transferred to the information processing apparatus 3. For example, the voice recognition function of the HMD device 2 may be transferred to the information processing apparatus 3, the voice signal is transmitted from the HMD device 2 to the information processing apparatus 3, the voice signal may be converted into voice data by the voice recognition function of the information processing apparatus 3.

Parts or all of the units the controllers 20, 30 may be configured with hardware circuits such as a field programmable gate array (FPGA) and an application specific integrated circuit (ASIC).

Further, it is possible to omit or modify a part of the constituent elements of the above exemplary embodiments within the scope not changing the gist of the present invention. Further, steps can be added, deleted, changed, and exchanged in the flow of the above exemplary embodiment within the scope not changing the gist of the present invention. Further, the program used in the above exemplary embodiment can be provided by being recorded on a computer readable recording medium such as a CD-ROM. In addition, the program used in the above exemplary embodiment can be stored in an external server such as a cloud server and can be used through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory; and
a processor, configured to:
receive identification information of a user of a display device and position information indicating a predetermined place, from the display device which displays an image of a virtual space so as to be superimposed on a real space; and
instruct the display device to display public information associated with the position information, at the predetermined place or in vicinity thereof, as an image of the virtual space, in a case where the public information is included in a public partner as a group belonging to an organization having the identification information of the user,
wherein the display device includes a virtual camera which virtually captures an image of the virtual space; and
count and record in the memory a number of views as one in a case where a distortion rate and an area of a virtual camera image captured by the virtual camera is equal to or greater than a threshold value.

2. The information processing apparatus according to claim 1,
wherein the display device has an image-capturing function, and
wherein the processor receives an image of the predetermined place captured by the display device, and acquires the position information from a code image included in the image.

3. The information processing apparatus according to claim 1,
wherein the public information includes information added by a person belonging to the same group as a group of the user.

4. The information processing apparatus according to claim 1,
wherein the public information includes a number of views of a person belonging to the same group as the group of the user.

5. The information processing apparatus according to claim 4,
wherein the number of views of the person is counted as one in a case where the distortion rate and the area of the virtual camera image captured by the virtual camera is equal to or greater than the threshold value.

6. The information processing apparatus according to claim 4,
wherein the number of views of the person is counted as one in a case where a capturing time of the virtual camera image captured by the virtual camera continues for a predetermined time or more.

7. The information processing apparatus according to claim 1,
wherein the public information is associated with the position information and feature information of an object, and
wherein the processor instructs the display device to display the public information as an image of the virtual space in the object or in vicinity thereof.

8. The information processing apparatus according to claim 6,
wherein the object is an object which is movable in the predetermined place.

9. The information processing apparatus according to claim 1,
wherein the processor receives position information indicating the position of the display device, and
instructs the display device to display the public information as an image of the virtual space, in a case where a distance from the display device to the predetermined place is equal to or less than a predetermined distance.

10. An information processing system, comprising:
a display device that displays an image of a virtual space so as to be superimposed in a real space;
a memory; and
a processor, configured to:
receive identification information of a user of the display device and position information indicating a predetermined place, from the display device;
instruct the display device to display public information associated with the position information, at the predetermined place or in vicinity thereof, as an image of the virtual space, in a case where the public information is included in a public partner as a group belonging to an organization having the identification information of the user, wherein the display device includes a virtual camera which virtually captures an image of the virtual space; and count and record in the memory a number of views as one in a case where a distortion rate and an area of a virtual camera image captured by the virtual camera is equal to or greater than a threshold value.

11. A non-transitory computer readable medium storing a program causing a computer to execute a process, the process comprising:

receiving identification information of a user of a display device and position information indicating a predetermined place, from the display device which displays an image of a virtual space so as to be superimposed on a real space;

instructing the display device to display public information associated with the position information, at the predetermined place or in vicinity thereof, as an image of the virtual space, in a case where the public information is included in a public partner as a group belonging to an organization having the identification information of the user, wherein the display device includes a virtual camera which virtually captures an image of the virtual space; and counting and recording in the memory a number of views as one in a case where a distortion rate and an area of a virtual camera image captured by the virtual camera is equal to or greater than a threshold value.

* * * * *